United States Patent Office 2,894,832
Patented July 14, 1959

2,894,832

PROCESS OF PRODUCING ACTINIDE METALS

Theodore T. Magel, Cambridge, Mass., assignor to the United States of America as represented by the United States Atomic Energy Commission No Drawing. Application April 12, 1949
Serial No. 87,140

7 Claims. (Cl. 75—84.1)

This invention relates to the preparation of metal compacts and, more particularly, to the preparation of rare dense metals in workable, coherent form.

This invention is particularly adapted to the preparation of metals such as thorium, uranium, plutonium, americium, curium and the like which are generally considered to be members of a second or actinide series of rare earth elements.

Many attempts have been made in the past to obtain such metals from their compounds in a relatively pure state. Such attempts to reduce a dense metal compound have been directed to the heating of a pure metal halide with a powerful reducing agent such as an alkali metal whereby the dense metal is obtained in the elemental state. Other methods have been tried, such as subjecting the oxide to high temperatures in an atmosphere of hydrogen for a long period of time.

The oxides of certain of these radioactive metals, however, cannot readily be reduced by hydrogen. Therefore, the halide reduction method has been used more extensively in this field than any other method. Certain disadvantages, however, are apparent to those skilled in the art in the application of the halide reduction method. For example, it is difficult to produce the halide in a pure state resulting in poor yields during reduction.

It is, therefore, the primary object of this invention to provide a method for preparing directly dense metals from their compounds.

It is another object of this invention to provide a method for preparing dense radioactive metals from their compounds.

It is another object of this invention to provide a method for reducing uranium compounds directly to the metal.

It is still another object of this invention to provide a method for reducing thorium compounds to the metal.

A still further object of this invention is to provide a method for preparing plutonium metal directly from its compound.

Still further objects of the method of this invention will become apparent from a description and examples which follow.

In general, the objects of the invention are achieved by treating a mixture of an oxide and a halide of dense radioactive metals with a strong alkali metal or alkaline earth metal reducing agent, preferably in the presence of a fluxing material.

The following example illustrates one method of applying the principle involved and, for this instance, uranium is selected as the metal desired.

*Example*

0.568 gram of $UO_2$ is mixed with 9.66 grams of $UF_4$ and placed in a cone-shaped beryllium oxide crucible and 0.33 gram of iodine and 0.50 gram of calcium are placed on top of the charge. The beryllium oxide crucible and the reactants are inserted in a steel bomb and placed in a centrifuge within an induction furnace (see applicant's co-pending application Serial No. 584,684, filed March 24, 1945, now Patent No. 2,825,105, issued March 4, 1958). The heat is turned on and centrifugal force is applied simultaneously for a period of about twenty minutes. A maximum temperature of 1350° C. is attained at the end of the first seven minutes and maintained at that value for thirteen minutes. A centrifugal force equivalent to about thirty times that of gravity is maintained throughout the process. This force is sufficient to cause a reduced uranium metal to coalesce in the tip of the refractory crucible, which effectively elutes the impurities and results in a substantially purified uranium metal globule.

Other embodiments of the invention are, of course, possible. Mixed oxides and halides of other metals such as plutonium, thorium, americium, neptunium, curium, protactinium, and the like, comprising the second or actinide series of rare earth elements, may be effectively reduced by the method of this invention by appropriate substitution in the example.

Plutonium dioxide with plutonium tetrafluoride, plutonium tetraiodide or plutonium tetrachloride may be substituted for the corresponding quantity of uranium oxide and uranium tetrafluoride in the example. The trihalide of these metals may be similarly used. Thorium dioxide and thorium tetrahalide, such as tetrachloride, tetrabromide, tetrafluoride and/or tetraiodide may be used.

Other alkaline earth metals, such as magnesium and barium, and alkali metals, such as sodium, potassium and lithium, may be used alone or in admixture as the reducing agent.

The method offers many advantages over previous methods. For example, the method avoids the preliminary, complete and expensive conversion of the dense metal compound to the pure halide.

It is now possible to reduce the oxide directly with a metal reducing agent which was not previously considered feasible from the results of treating the oxide without admixed halide.

While it is thus seen that many embodiments of the invention are possible, it is to be understood that the invention is not to be limited except as indicated in the appended claims.

What is claimed is:

1. A method of preparing thorium in a compacted, ductile form which comprises heating a mixture of thorium oxide and thorium halide with an alkaline earth metal in the presence of iodine to a temperature sufficiently elevated to effect reduction of the mixed thorium compounds.

2. A method of preparing uranium in a compacted, ductile form which comprises heating a mixture of uranium oxide and uranium halide with an alkaline earth metal in the presence of iodine to an elevated temperature sufficiently high to effect reduction of the mixed uranium compounds.

3. A method of preparing uranium in a compacted, ductile form which comprises heating a mixture of uranium dioxide and uranium tetrafluoride with an alkaline earth metal in the presence of iodine to an elevated temperature sufficiently high to effect reduction of the mixed uranium compounds.

4. A method of preparing thorium in a compacted, ductile form which comprises heating a mixture of thorium dioxide and thorium tetraiodide with an alkaline earth metal in the presence of iodine to a temperature sufficiently elevated to effect reduction of the mixed thorium compounds.

5. A method of preparing metals of the second rare earth series which comprises contacting a mixture of an oxide and halide of a such metal with iodine and a strong metal reducing agent of the class consisting of alkali metals and alkaline earth metals at an elevated temperature to effect a reduction of the second rare earth series compounds to the metal.

6. A method of preparing plutonium in a compacted, ductile form which comprises heating a mixture of plutonium oxide and plutonium halide with an alkaline earth metal in the presence of iodine to a temperature sufficiently elevated to effect reduction of the mixed plutonium compounds.

7. A method of preparing plutonium in a compacted, ductile form which comprises heating a mixture of plutonium dioxide and plutonium trichloride with an alkaline earth metal in the presence of iodine to a temperature sufficiently elevated to effect reduction of the mixed plutonium compounds.

References Cited in the file of this patent

UNITED STATES PATENTS

| | | |
|---|---|---|
| 1,437,984 | Marden | Dec. 5, 1922 |
| 1,573,083 | Marden | Feb. 16, 1926 |
| 1,659,209 | Marden | Feb. 14, 1928 |